Patented Dec. 18, 1934

1,984,368

UNITED STATES PATENT OFFICE 1,984,368

COATING AND IMPREGNATING COMPOSITION

Henry A. Gardner, Washington, D. C.

No Drawing. Application December 15, 1931
Serial No. 581,275

8 Claims. (Cl. 134—21)

This invention relates to coating compositions; and it comprises toluenesulfonamid resin dissolved as a clear solution in water carrying a relatively large amount of a caustic alkali, this alkali being usually either caustic soda or caustic potash and the aqueous solution usually carrying 6 to 10 per cent of the alkali, with respect to the aqueous solution, ammonia being sometimes substituted for the caustic soda or caustic potash to form an aqueous liquid of equivalent alkalinity, such solutions being useful in forming coating compositions and also as impregnating liquids; all as more fully hereinafter set forth and as claimed.

Toluenesulfonamid and certain similar sulfonamid bodies derived from xylene, benzene or other aromatic hydrocarbons, when condensed with formaldehyde or other aldehyde, form interesting compounds which are usually resinous in nature. In this specification, by the term arylsulfonamid resin, I mean the reaction products obtained by reacting aldehydes with arylsulfonamids. They may be called arylsulfonamid-aldehyde resins. I have found that alkaline aqueous solutions of these resins have unusually interesting and important properties. The resins can be readily brought into aqueous solution by the use of alkali, but the alkali plays, so to speak, the part of a temporary solvent. Toluenesulfonamid resin, and its congeners, dissolve freely in a caustic soda solution with a strength between 6 and 10 per cent. The solution is transparent, freely mobile and stable. With pure preparations, the solution is water white and colorless. It enters capillaries and can be used in impregnating paper; one of the uses hereinafter stated. A solution in 6 per cent caustic soda solution carrying its own weight of toluenesulfonamid resin, has the stated properties. This solution can be diluted with water down to an alkaline strength, with respect to the water, of somewhere around 4 per cent without loss of its transparency. Upon diluting with further amounts of water, first opalescence and then white turbidity occur, while, on increasing the amount of water further, the toluenesulfonamid resin goes out of solution. Precipitation is practically complete when the alkalinity is less than 3 per cent. The precipitate is a beautiful white, opaque material, which, once formed, is insoluble in the dilute alkaline mother liquor.

I have found that the original clear alkaline solution, on drying, forms a film or layer of clear resin. This, on washing as by immersion in water, first becomes white and opaque, giving up alkali to the water. After washing and drying the layer becomes clear and transparent, and is insoluble in water.

In practicing my invention, I first form a clear solution of resin in alkali. I usually contemplate a solution of resin in 8 per cent aqueous caustic soda lye. Other strengths of alkali are not as advantageous. A similar strength of potash solution may be used. The 8 per cent caustic soda solution of toluenesulfonamid resin, is a convenient strength for packaging and shipment. The user can, and frequently does, dilute this stock solution before use to, say, 4 per cent caustic alkali, calculated on the amount of water present. The concentrated liquid or the dilute liquid can be applied in many ways. It can be applied to paper and the paper washed with water, setting free a resin in the pores. On drying the washed paper, it is found waterproofed, in the sense that the fibers no longer take up water readily. On hot pressing the impregnated paper, the contained resin melts to a continuum, giving a translucent or transparent paper of good waterproof properties. The index of refraction of the resin and of the paper fiber are not widely different, whence the transparency, the paper thus prepared is very flexible and may be used for wrapping food.

In the specific embodiment of this part of my invention I utilize my discovery in improving commercial sheeted, regenerated cellulose ("cellophane"). An 8 per cent solution of caustic soda is mixed with an equal weight of toluenesulfonamid resin. The resin goes into a clear solution. The liquid is then diluted with its own volume of water. Sheeted regenerated cellulose is immersed in this liquid and allowed to remain in contact for a period of, say, 10 hours. The sheet is then passed between rolls to remove excess solution and washed with water. This gives a slightly opaque aspect to the layer, which disappears on drying. The washed material is dried. There is an increase in strength which is usually of the order of 10 per cent upon the original tensile strength. The washed, dried sheet may or may not be heated to fuse the resin in situ. One advantage of the "cellophane" thus treated is that it now can be lacquered readily, the lacquer bonding well; there is a tenacious adherence between the lacquer film and the base. Ordinarily, sheeted regenerated cellulose is quite difficult to lacquer with nitrocellulose lacquers. The adhesion is poor and stripping is apt to occur.

In using my invention in improving commercial sheeted cellulose, I can use an ammonia solution of the toluenesulfonamid resin and obtain a still greater improvement in tensile strength of the final material, but at a somewhat greater cost. An increase in tensile strength of 25 per cent may be obtained.

In using my new solution as a paint or varnish it is applied to a suitable surface, alone or admixed with a filler, such as barium sulfate, and dried in place. On washing the dried article with water, the alkali is quantitatively removed. If desired, the washed, dried, coated surface may be warmed to fuse the resin. Such treatment is quite feasible, because of the low melting point of my precipitated resin. By using a mixture composed of toluenesulfonamid resin dissolved in 8 per cent caustic soda solution and admixed with filler, a good cold water paint can be made, applicable for many purposes.

The described solution offers an excellent means of waterproofing concrete, cement and other surfaces in exposed situations. It is merely necessary to paint a porous surface with the solution, allow it to be absorbed and then wash with water. The action of the water precipitates the resin in the pores.

In using my invention for treating paper, an alkaline toluenesulfonamid resin solution admixed with a filler may be used both for coating and for waterproofing. On application of a composition of toluenesulfonamid resin dissolved in 8 per cent caustic soda and thickened with barium sulfate, a portion of the solution enters the pores and the rest remains as a coating; acting as a binder for a pigment layer. By washing the paper with water, or by drying and then washing, an excellent coated and impregnated paper is obtained. By heating the coated paper sufficiently to fuse the resin, an improved article is made.

Paper treatment and the treatment of textile sheets may be continuous. For instance, a continuous web of paper may be first passed through the aqueous alkaline solution of the toluenesulfonamid resin, passed through rolls to squeeze out excess and then passed into a bath of water. Upon contact of the impregnated web of paper with the water, the resin is precipitated and forms an integral portion of the paper. The alkali is dissolved and washed out in the water bath. The fibers are individually and thoroughly coated. After the washing with water, the web of paper may be dried. If desired, the dry paper may be then heated to fuse the resin. This fusion of resin may be effected by passing the paper over hot rolls.

In making a paint-like composition, 100 parts by weight of caustic soda solution containing 92 parts of water and 8 parts NaOH are used to dissolve 100 parts of toluenesulfonamid resin. Into this liquid is incorporated its own weight of barium sulfate or similar pigment or filler. This gives a mixture which can be usefully employed in coating paper and many other materials. The composition may be applied to paper or textile sheets, or a web of paper may be continuously treated. The operation is exactly the same as before, save that a paper is obtained carrying a surface layer or coating of the pigment bonded by the resin. Washing with water, drying, etc., are as before. Hot pressing is usually desirable. The composition with the filler may be applied to a wall or other surface and allowed to dry, the wall being afterward washed or sprayed with water.

In another embodiment of my invention, 50 parts by weight of toluenesulfonamid resin are dissolved in 50 parts of a 6 per cent caustic soda solution (94 parts of water and 6 parts of caustic soda). The liquid is used to impregnate porous, granular or powdered fillers, such as wood flour or oxidized oil meal. The impregnated filler is mixed with a suitable quantity of water to precipitate the resin on the filler. The excess of water can be drained off, taking the alkali with it. The washed mixture of filler and resin is dried to remove the rest of the water. Drying may be advantageously done in a current of warm air. The humidity of the air may be controlled, if desired. The dry mixture of resin and filler thus produced gives a thermoplastic molding composition which is advantageous for many purposes. It may be molded under heat and pressure; the shaped article being set by cooling after shaping. Molded articles may be made from pulp board impregnated with solution, washed, dried and then hot pressed. Laminated sheets may be made by assembling thin sheets prior to hot pressing.

Composite mixtures may be made containing other resins, such as shellac, and other binders, such as casein. Both casein and shellac are soluble in the alkaline aqueous liquid. Latex may be admixed. One suitable coating composition for paper is made by adding 5 parts by weight of casein and 5 parts by weight of shellac to 50 parts of an alkaline aqueous solution of toluenesulfonamid resin, this solution consisting of equal weights of the resin and of a 6 per cent caustic alkali solution. To the solution may be added 25 parts of barium sulfate. This composition is particularly adapted for the treatment of paper. The impregnated and coated paper may be given a high gloss finish by hot rolls.

A good cold water paint is obtained by omitting the casein and shellac from the composition just described and increasing the barium sulfate. An equal amount of barium sulfate by weight may be mixed with the alkaline aqueous solution. It may be brushed or sprayed on a wall of concrete, cement, wood, etc., and allowed to dry in place, being afterward sprayed with water to set the resin and remove the alkali and then dried. The preliminary drying is chiefly to give opportunity for the liquid to penetrate the pores. Upon final drying, a good coating, strongly bonded to the surface, is produced. In these cold water paints, all or part of the barium sulfate, or blanc fixe, may be replaced with zinc oxid, titanium oxid white lead, zinc sulfid, lithopone, or other white pigment. If colored paints are desired, suitable colored mineral pigments or dyes may be added. A small amount of glue is sometimes a useful addition.

In all of the above compositions, resins derived from xylene, benzene, naphthalene and other aromatic sulfonamids may be substituted for the toluenesulfonamid resin. Other fillers, either mineral or fibrous, may be substituted for the barium sulfate and the wood flour mentioned above. Glue and like substances may be substituted for casein.

In many cases, in applying the composition of the present invention for coating and impregnating, it is advantageous to dilute it to a point where a further addition of water will form a precipitate. That is, the solution is brought to incipient precipitation before being used. In many cases, it is advantageous to dry a coated surface before the application of water; while in other cases, it is better to dry after the application of water and the washing. However, in all cases, there is a final drying and sometimes a following heating to fuse the resin in place.

While I have spoken specifically of toluenesulfonamid resins, a body formed from toluenesulfonamid with the aid of formaldehyde, the other and corresponding aryl compounds containing benzene, naphthalene, xylene, in lieu of a toluene residue, are equally applicable and may be used in the same preparations.

In the case of the addition of bodies normally soluble in alkaline solution, such as shellac, casein, latex, etc., I have found that precipitation of the toluenesulfonamid resin with water tends to bring down these bodies; probably because their solution is more or less of a colloid character.

One useful embodiment of the present invention is in forming coating layers on floors under construction. By pouring the solution of the present invention on a concrete floor, brushing or allowing it to flow to even texture and allowing it to stand overnight, on washing with water the next day, the composition is converted, after again drying, into a rubbery, resilient layer, pleasant under foot and of good insulating value. The coated floors can be used as soon as they are dry and resist the abrasion of ordinary use indefinitely long. In many ways, the coating is equivalent to linoleum.

The properties on dilution with water appear, to some extent, to depend on a dissociation phenomenon; depending partly on the amount of water and also, to some extent, upon the ratio between the alkali present and the resin. Using 100 parts of an 8 per cent water solution of caustic soda and adding 100 parts of resin, a clear solution results. This solution contains 8 grams NaOH for 100 grams of resin and will withstand considerable dilution before becoming cloudy. By using a 6 per cent solution, that is, with a ratio of NaOH to resin of 6:100, the solution precipitates on dilution down to about 3 per cent of alkali. This 6 per cent solution is convenient for storing, shipping and handling. While a solution containing the same amount of resin can be made with a 4 per cent NaOH solution, it is not as convenient to handle and does not stand as much dilution.

The above results were attained with the ordinary commercial form of toluenesulfonamid resin. This I find most advantageous in use. Where this ordinary commercial form is further condensed, by using more formaldehyde or longer heating, the solubility relations differ. Analogous solubilities, however, obtain.

In many cases, I use a small proportion of a volatile solvent, such as ether, alcohol or acetone, in the water solution. I may, for example, cut the resin with ether; mixing 15 parts of ether by weight with 85 parts of resin to obtain a liquid mass. These cut resins may be used in the foregoing described embodiments of my invention. When so used, the dilution conditions become somewhat different, more water being necessary to produce the same amount of precipitation. The precipitate formed, however, is in general of a somewhat better character; there is less risk of forming stringy separations by incautious work. The main purpose of first cutting the resin with a solvent is, however, convenience in making up the composition of the present invention, as it will then pour, whereas the ordinary commercial form of resin is viscous and difficult to handle. When I use it, I generally melt it and add it to the alkali solution in molten form.

What I claim is:—

1. As a new coating composition, an arylsulfonamid-aldehyde resin dissolved in an aqueous alkaline solution, said solution having an alkalinity not less than that corresponding to a 3 per cent caustic soda solution.

2. As a new coating composition, a solution comprising an arylsulfonamid-aldehyde resin dissolved in an aqueous alkaline liquid, the amount of said dissolved resin forming approximately half of the composition, the strength of alkali being sufficient to permit a further dilution with water.

3. As a new coating composition, a toluenesulfonamid-formaldehyde resin dissolved in an approximately equal amount of an aqueous alkaline solution, the strength of alkali being sufficient to permit a further dilution with water.

4. The composition of claim 1 wherein the alkali is caustic soda.

5. The composition of claim 1 wherein the alkali is caustic soda and the alkalinity corresponds to about 6 per cent NaOH based on the weight of the water.

6. A coating composition according to claim 1 wherein the aqueous alkaline solution of arylsulfonamid-aldehyde resin carries a suspended filler.

7. A coating composition according to claim 1 wherein the aqueous alkaline solution also contains a small amount of volatile organic solvent, said organic solvent being incapable of neutralizing the alkalinity of said resin solution.

8. A coating composition according to claim 1 wherein the aqueous alkaline solution also contains a small amount of ether.

HENRY A. GARDNER.